Dec. 13, 1955
C. L. WARE
2,726,450
GEOMETRICAL TRACING MACHINE
Filed Aug. 17, 1950
8 Sheets-Sheet 1
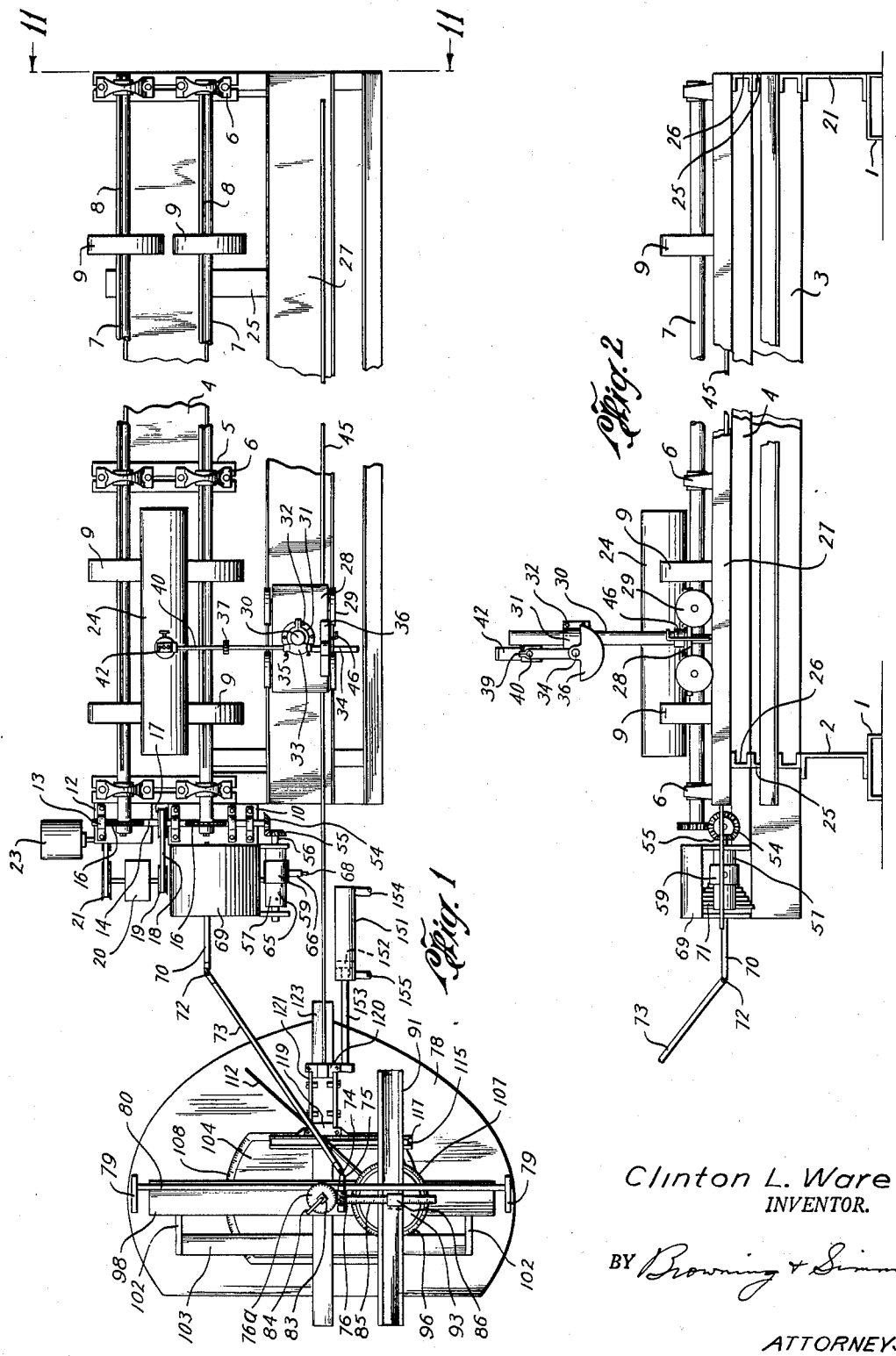
Clinton L. Ware
INVENTOR.
BY
ATTORNEYS

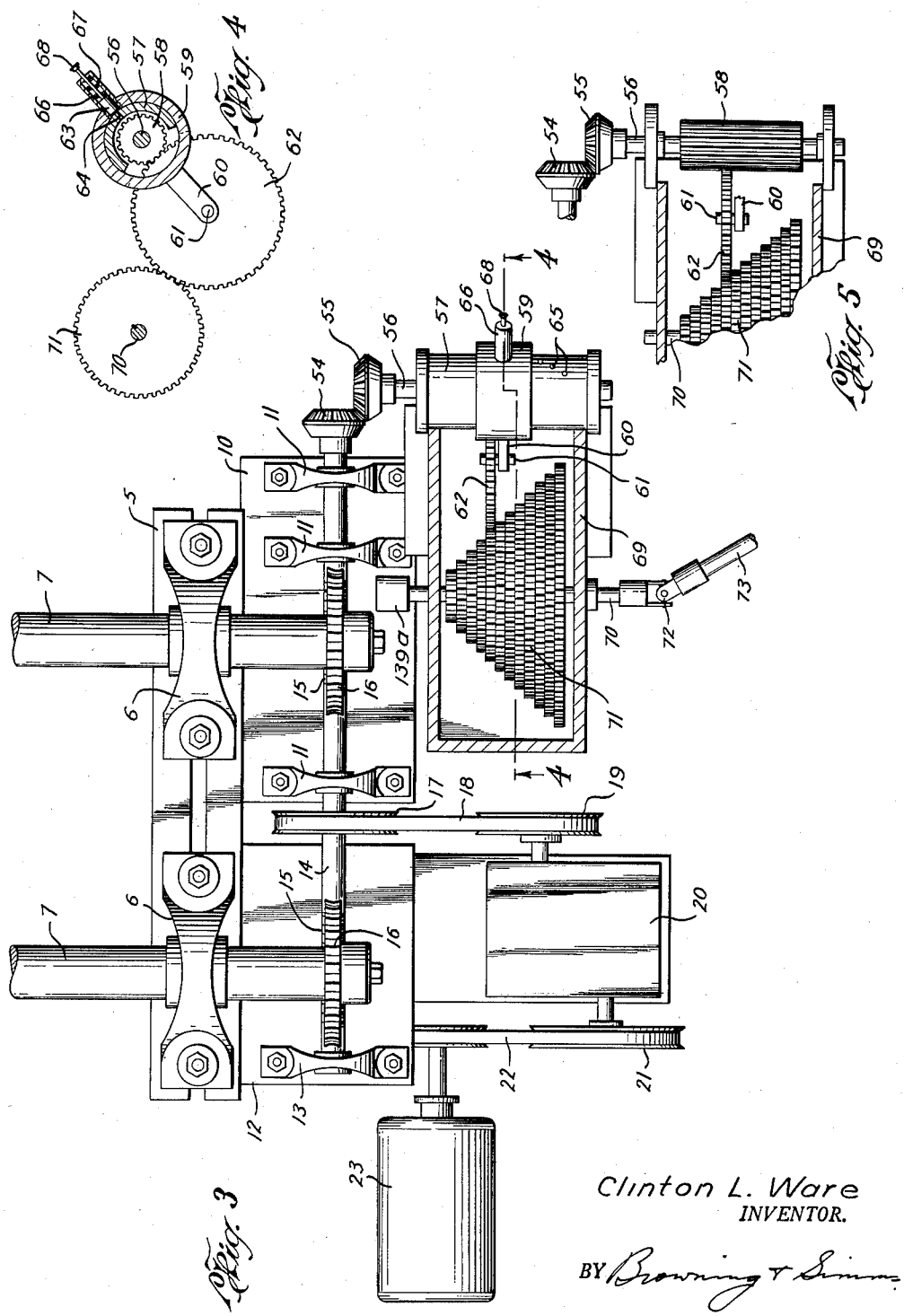

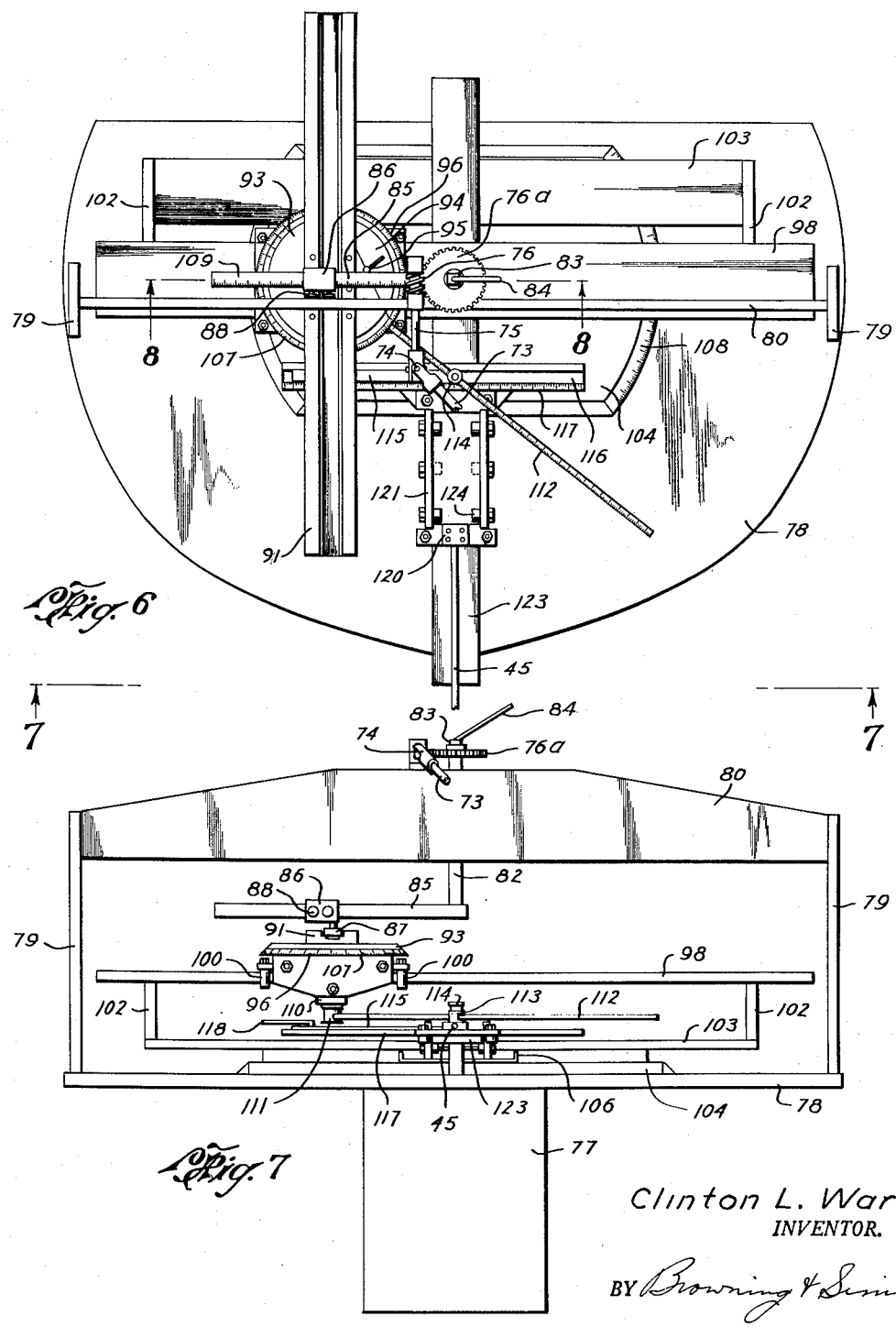

Dec. 13, 1955     C. L. WARE     2,726,450
GEOMETRICAL TRACING MACHINE
Filed Aug. 17, 1950     8 Sheets-Sheet 4
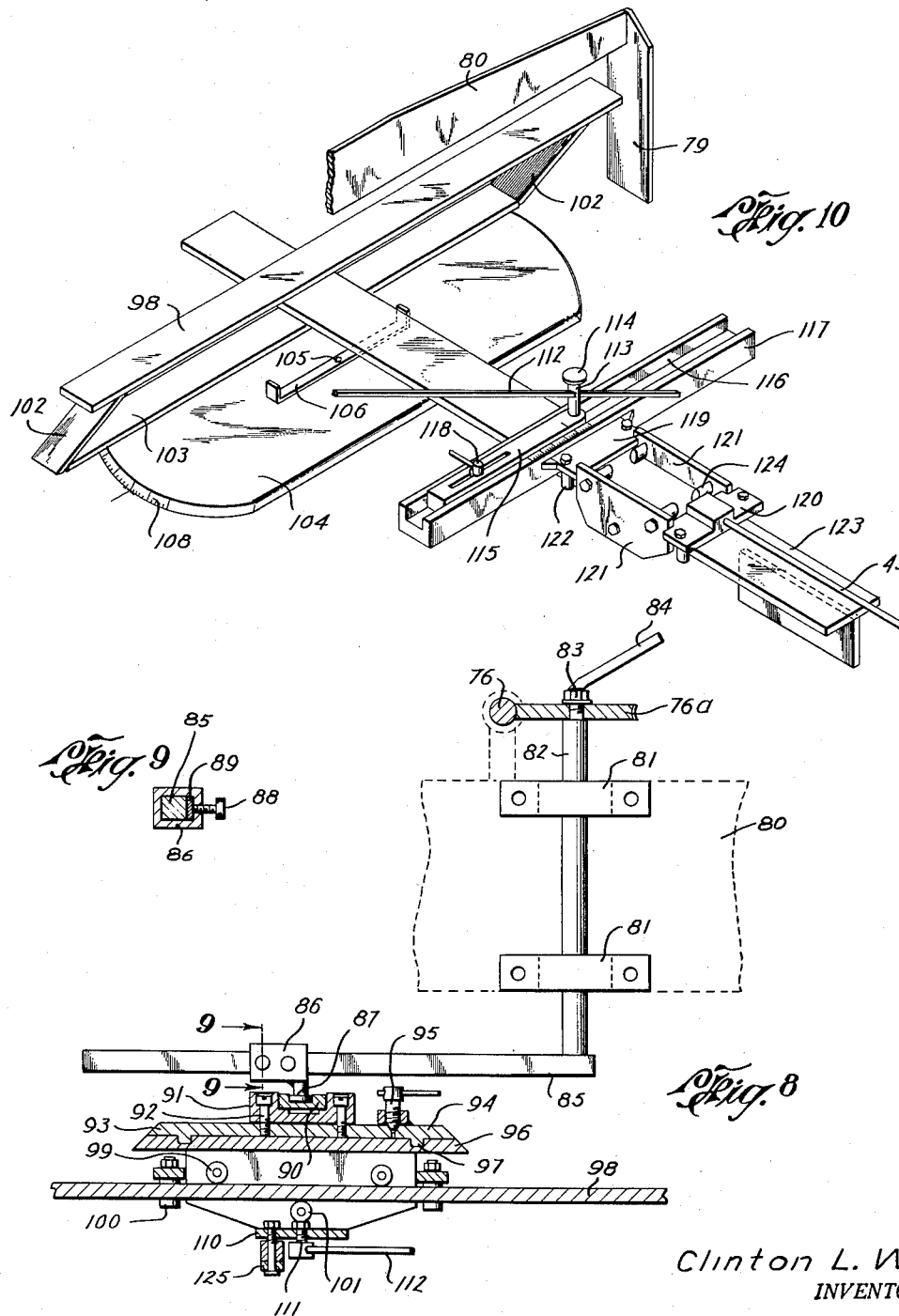
Clinton L. Ware
INVENTOR.
BY Browning & Simms
ATTORNEYS

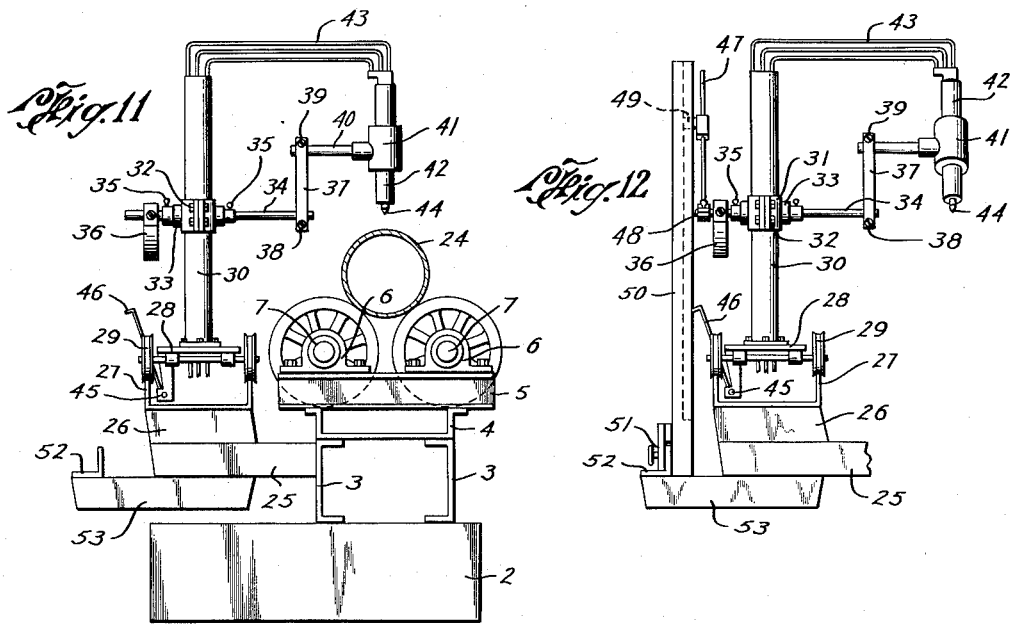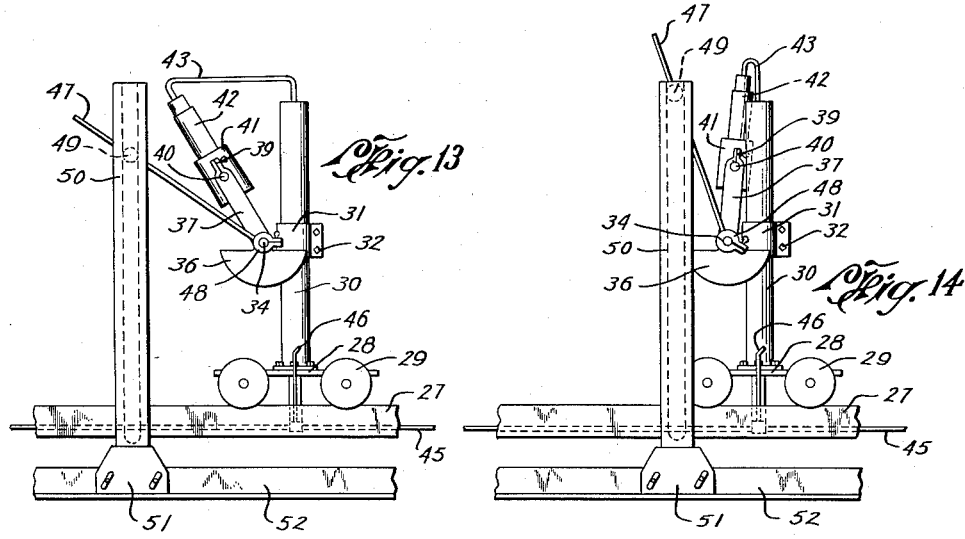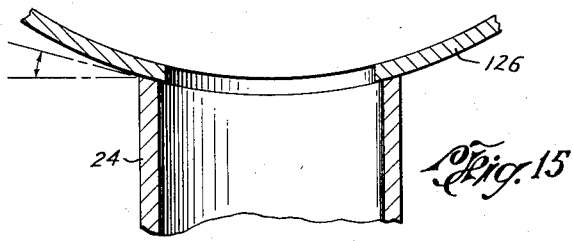

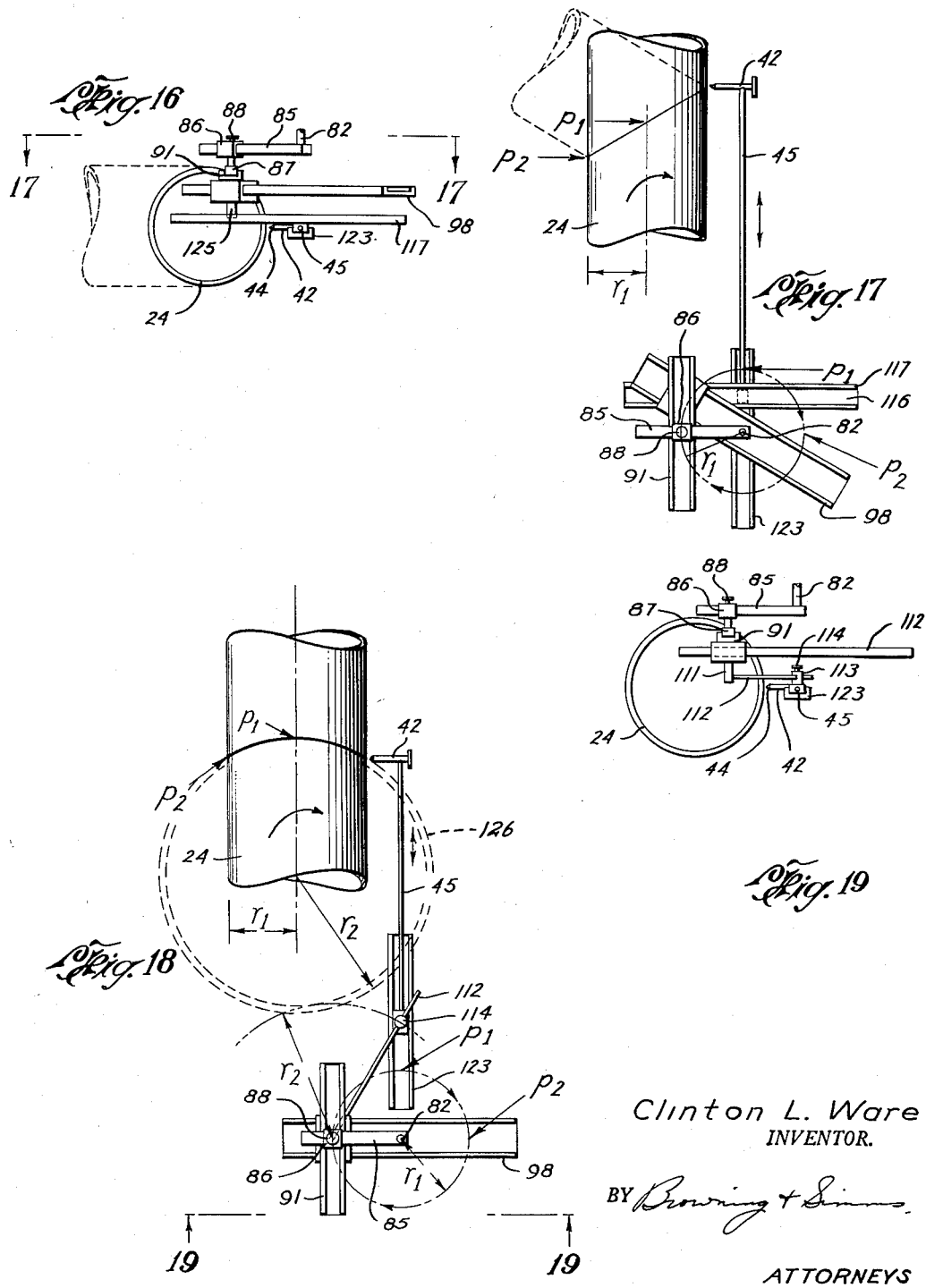

Dec. 13, 1955
C. L. WARE
2,726,450
GEOMETRICAL TRACING MACHINE
Filed Aug. 17, 1950
8 Sheets-Sheet 7
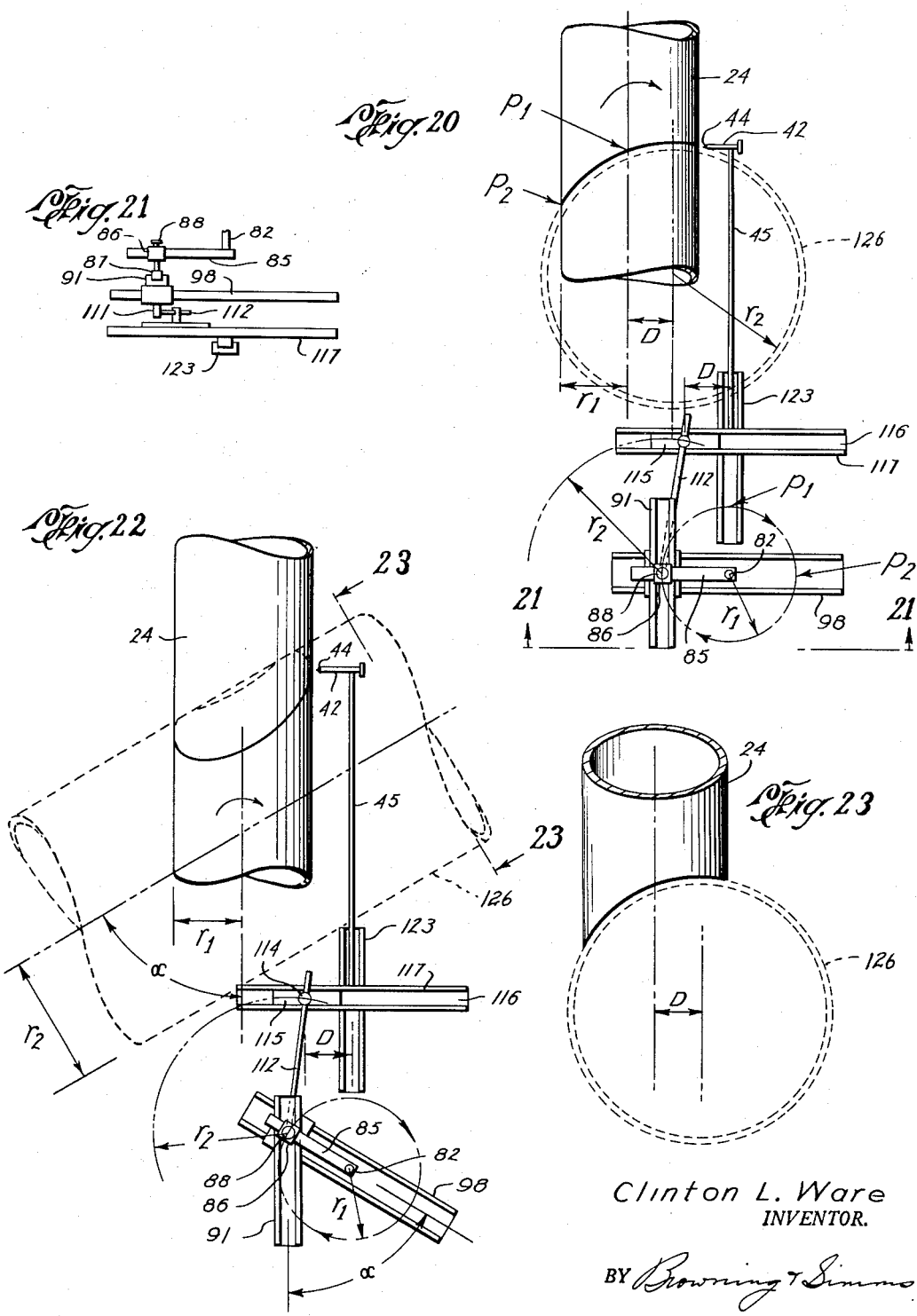
Clinton L. Ware
INVENTOR.
BY Browning & Simms
ATTORNEYS

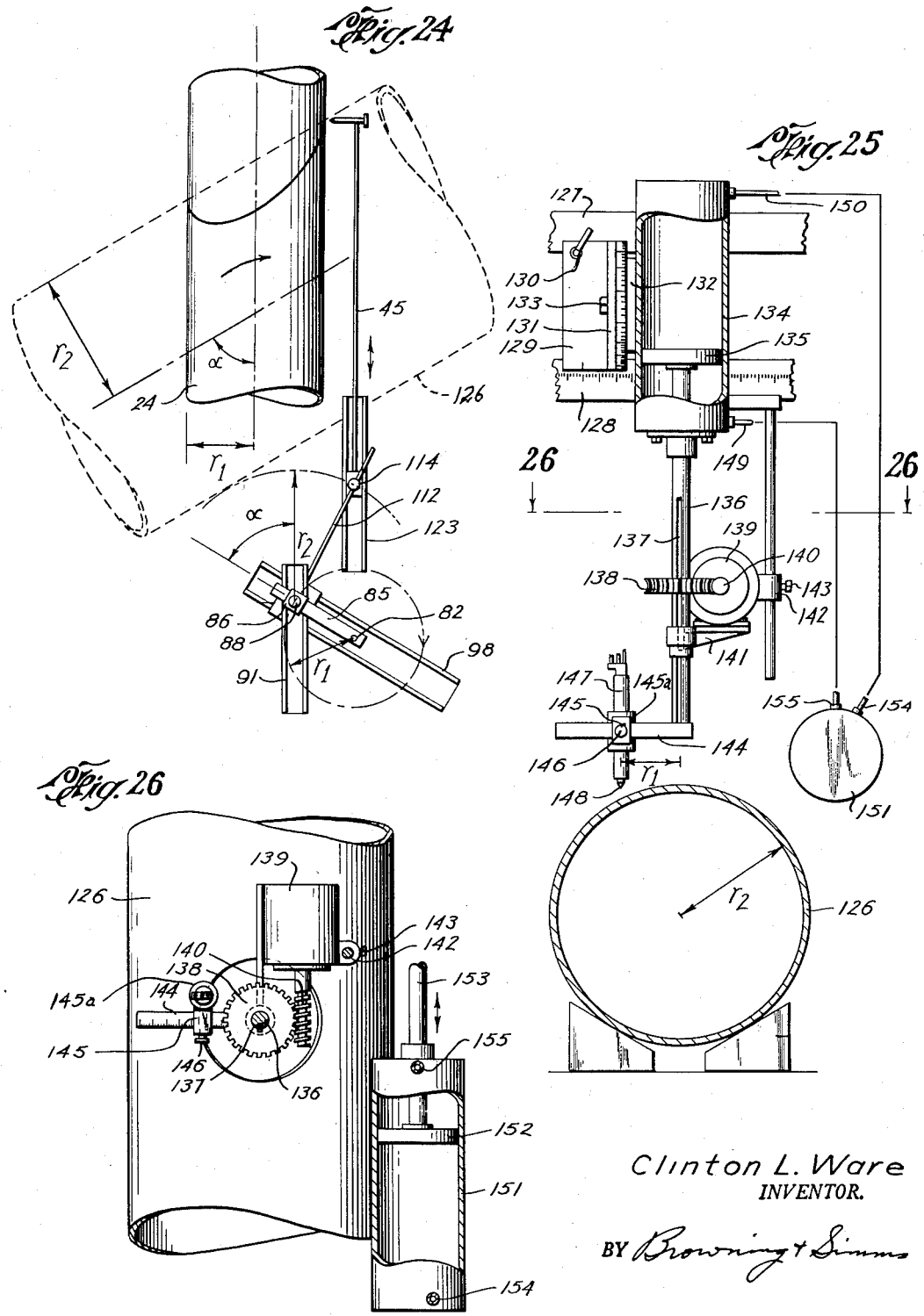

United States Patent Office 2,726,450
Patented Dec. 13, 1955

2,726,450

GEOMETRICAL TRACING MACHINE

Clinton L. Ware, Houston, Tex.

Application August 17, 1950, Serial No. 180,050

17 Claims. (Cl. 33—21)

This invention relates in general to geometrical tracing machines and has for its general object the provision of such a machine which will trace mechanically on one of a pair of surfaces, the line of contour along which said surface would intersect the other of the pair of surfaces, at least one of the surfaces being a cylinder.

More specifically, it is an object of this invention to provide such a machine which will accurately trace the line or contour along which the smaller of a pair of cylinders would have to be cut off in order to accurately fit another larger cylindrical surface with the axes of the two surfaces making a given angle with each other and when the axes either intersect or are offset a given distance from each other.

Another object of this invention is to provide such a machine by which may be traced on a cylindrical surface the line or contour along which such surface must be cut in order to make it fit accurately against a plane surface at a given angle.

Another object of this invention is to provide a machine of the character referred to by which it will be possible to trace upon a plane surface the line or contour along which such surface would be intersected by a cylindrical surface of given radius with its axis at a given angle to the plane surface.

Another object of this invention is to provide such a machine by which it will be possible to trace the line or contour on the larger of two cylindrical surfaces by which that surface would be intersected by a smaller cylindrical surface whose axis is disposed at a given angle to the axis of the larger cylindrical surface and whose axis either intersects or is offset from the axis of the larger cylindrical surface by a predetermined amount or distance.

Another object of this invention is to provide a machine of the character referred to in which it will be possible to vary the setting of the machine to accommodate different angles of incidence between the axis of a cylinder and the plane of a plane surface or the axes of two different cylinders, as the case may be, without calculation.

Another object of this invention is to provide such a machine in which it will be possible to adjust the machine without calculation to accommodate different radii of one or both of the cylinders with which the machine is intended to deal.

Another object of this invention is to provide a machine of the character referred to in which it will be possible to adjust the machine without computation to accommodate different degrees of offset between the axes of two cylinders of which are to intersect.

Other objects and advantages of this invention will become apparent from the following description taken in connection with the accompanying drawings wherein is set forth by way of illustration and example one embodiment of the invention.

In the drawings:

Fig. 1 is a plan view of a machine embodying this invention with parts broken away in order to facilitate the illustration, the machine as illustrated being equipped not only for defining upon a pipe or other cylindrical member the path along which it should be cut in order to fit a different cylindrical member, but to actually make such cut;

Fig. 2 is a side elevation of a portion of the apparatus illustrated in Fig. 1;

Fig. 3 is a top plan view with parts broken away and shown in cross section for purposes of illustration, illustrating the primary driving and gearing mechanism of the machine shown in Figs. 1 and 2;

Fig. 4 is an end elevation partly in cross section along the line 4—4 of Fig. 3 showing a portion of the gearing mechanism illustrated in Fig. 3;

Fig. 5 is a fragmentary view similar to the lower right-hand portion of Fig. 3 but with additional parts broken away and shown in cross section, illustrating the manner of setting the driving gears for different operations;

Fig. 6 is a top plan view of that portion of the mechanism which controls movements of the tool traveling over the cylinder or over the plane surface to define the desired line or contour of intersection;

Fig. 7 is an end elevation of the mechanism illustrated in Fig. 6, taken along the line 7—7 of Fig. 6;

Fig. 8 is a fragmentary view partly in vertical cross section and partly in elevation illustrating a portion of the mechanism shown in Figs. 6 and 7;

Fig. 9 is a vertical cross section taken along the line 9—9 of Fig. 8;

Fig. 10 is a view partly in perspective and partly in section likewise illustrating a portion of the mechanism shown in Figs. 6 and 7;

Fig. 11 shows an end elevation along the line 11—11 of the mechanism illustrated in Fig. 1, and showing particularly the means for rotating the cylindrical workpiece and the means for mounting the tool which travels over the workpiece to define the desired path of intersection;

Fig. 12 is a fragmentary view similar to a portion of Fig. 11 and illustrating the use of an attachment for providing for the desired tilting of the tool as it moves along its contour;

Fig. 13 and Fig. 14 are side elevation views of the same mechanism as is illustrated in Fig. 12 showing how that mechanism operates to control the tilting of the tool as the tool moves along its path of travel;

Fig. 15 is a fragmentary cross sectional view through a joint between two cylindrical members such as may be provided by the machine of this invention, and illustrating the reason for providing for tilting of the tool as it moves along its path of travel;

Fig. 16 is a fragmentary view diagrammatic in nature illustrating the tool controlling mechanism operating on a pipe for the purpose of defining the path along which such pipe would intersect with a plane surface or with another pipe of the same diameter;

Fig. 17 is a top plan view of the structure illustrated in Fig. 16, taken along the line 17—17 of Fig. 16;

Fig. 18 is a view similar to Fig. 17 but illustrating the mechanism set up to define through the movements of the tool the path along which two cylindrical surfaces would intersect at right angles with their axes in the same plane;

Fig. 19 is an end elevation of the structure illustrated in Fig. 18 taken along the line 19—19 of Fig. 18;

Fig. 20 is a view similar to Figs. 17 and 18 but illustrating the parts of the mechanism arranged for the purpose of defining the path or contour along which two cylindrical members would intersect each other with their axes at right angles to each other but offset from each other by a predetermined or given distance;

Fig. 21 is a view taken along the line 21—21 of Fig.

20 and showing the control mechanism in end elevation;

Fig. 22 is a view similar to Figs. 17, 18 and 20 but with the mechanism set up to cause the tool to define the line or contour along which two cylindrical surfaces would intersect with their axes at an angle other than a right angle and with those axes offset from each other by a given distance;

Fig. 23 is a view similar to the upper part of Fig. 20 but illustrating the joint shown in Fig. 22;

Fig. 24 is a view similar to Figs. 17, 18, 20 and 22 but illustrating the mechanism set up in such fashion as to cause the tool to define the path or contour along which two cylindrical surfaces would intersect each other with their axes at a given angle to each other other than 90°, but with their axes lying in the same plane;

Fig. 25 is a view of a workpiece and tool mounting adapted to be controlled by the mechanism illustrated in Figs. 6 and 7 to define on the surface of a cylindrical member or on a plane surface the line or contour of intersection between such cylindrical member and another cylindrical member of the same or a lesser diameter, or between such plane surface and a cylindrical member, parts of this mechanism being shown in elevation and other parts being broken away and shown in cross section;

Fig. 26 is a horizontal cross section taken along the line 26—26 of Fig. 25, parts being shown in elevation and other parts being broken away and shown in horizontal cross section for purposes of better illustration.

Referring now more in detail to the drawings, the portion of the machine which is adapted to support and rotate one of the cylindrical members and the tool traversing that member for the purpose of defining the path or contour of intersection, being illustrated in Figs. 1 and 2, is mounted upon any suitable framework which may consist of channels or similar support beams 1 on which are carried upright support members 2. The support members 2 extend generally crosswise of the length of the machine and supported on the members 2 and extending lengthwise of the machine are a pair of beams 3 on which is carried a supporting plate which may be in the form of a channel member 4.

At intervals along its length the channel member 4 is provided with transversely extending bars 5 upon which are carried journal bearings 6 adapted to receive parallel shafts 7. These shafts are each provided preferably with a keyway 8 which extends throughout the length of the shaft, and rollers 9 are provided on the respective shafts, these rollers being movable axially along their respective shafts but being keyed in the keyways 8 so that they may not rotate with respect to their shafts. These rollers 9 are adapted to receive the workpiece in the manner presently to be set forth and to rotate the same, and for that reason may be provided with a suitable tread, it having been found satisfactory to surface the treads of these rollers with rubber or similar material.

Adjacent one end, the frame is provided with a plate-like support 10 projecting beyond the frame and supporting journal bearings 11 having their axes aligned in a direction substantially at a right angle to the longitudinal direction of the frame as a whole. Spaced from the support 10 but on the same level is a similar support 12 having a journal bearing 13 aligned with the bearings 11. Extending through these journal bearings 11 and 13 and supported thereby is a drive shaft 14 having two drive worm gears formed thereon adapted to mesh with and drive worm wheels 16 which are carried respectively on the two shafts 7. Thus, as the shaft 14 is rotated, the two shafts 7 will likewise be rotated both in the same direction.

Intermediate the supports 10 and 12 the shaft 14 is provided with a pulley or sheave 17 adapted to receive a drive belt 18 which is in turn driven from the output pulley 19 of a gear box 20. This gear box 20 constitutes a reduction gear mechanism and is adapted to receive power through a pulley 21 driven by a belt 22 from a motor 23 or other suitable source of power.

Thus it will be seen that a workpiece which may be in the form of a cylindrical pipe 24, may be supported upon the rollers 9 and by operation of the motor 23 caused to rotate about its own axis. No adjustment of the mechanism thus far described is necessary in order to enable it to receive, support and rotate a workpiece of any desired diameter. All that is necessary is to put the workpiece in place on the rollers 9 and start the mechanism and the workpiece will automatically be rotated about its own axis regardless of its diameter.

For the purposes of movably supporting a tool in proper position to move and define upon the surface of a workpiece 24 a desired line or contour of intersection between such workpiece and another cylindrical surface or a plane surface, certain beams 25 may be secured to the frame previously described and caused to extend laterally therefrom so as not to underlie the shafts 7 or the trunnions 9. On the outer end portions of these beams 25 may be provided suitable blocks or intermediate supports 26 and suitable means for forming a track. The track in this instance is provided by means of a channel member 27 having its flanges upturned and being disposed substantially parallel to the shafts 7 and supported by the members 26. This channel member or track 27 preferably extends substantially the entire length of the frame previously described.

Movably supported by the track 27 is a carriage 28 having flanged wheels 29 thereon guided by and restrained by the track 27 so that the carriage 28 may move substantially parallel to and only substantially parallel to the shafts 7. Such restriction also causes this carriage to move substantially parallel to the axis of a workpiece 24 supported on the rollers 9.

Extending substantially vertically from the carriage 28 is a post 30 which forms the main support for the tool. This post 30 is engaged by a clamp 31 adapted to be adjustably secured to the post in any desired position by means of clamping bolts 32, and carrying a journal bearing 33 in which is rotatably mounted a shaft 34 extending in a horizontal direction. In any desired situation the shaft 34 may be restrained against rotation by means of clamping screws 35 carried on the journal bearing 33. For the purpose of counterbalancing the weight of the tool presently to be described, a counterweight 36 may be secured to the shaft 34 at an appropriate point.

On that end of the shaft 34 which extends toward a position overlying the rollers 9 is provided a crank arm 37 adapted to be clamped to the shaft 34 so as to rotate therewith by means of suitable clamping bolt or the like 38. The opposite end of this crank arm 37 likewise carries a clamping mechanism 39 adapted to clamp it to a shaft 40.

The shaft 40 is provided with a tool holder 41 whose axis may for convenience be so adjusted as to lie in a vertical plane half way between the axes of the two shafts 7 or directly in vertical alignment with the axis of a cylindrical workpiece 24 supported on the trunnions 9, but which may be adjusted to attack the surface of the workpiece at any position and at any desired angle. This tool holder 41 is adapted to receive a suitable tool 42 which in this instance is illustrated as being a cutting torch adapted to be supplied with fuel and the like through lines 43 which extend up through the post 30, and which has its cutting end or nozzle 44 disposed closely adjacent the surface of the workpiece 24. Preferably this cutting point or nozzle 44 is in substantial alignment with the axis of the shaft 34 so that rotation of the shaft 34 will not move the point 44 toward or away from the workpiece 24.

It will be understood that instead of a cutting torch 42, some other form of tool may be employed, such as some other form of cutting device, or simply a marking tool for outlining on the surface of the workpiece 24 the path of intersection to be desired. It is to be noted that the workpiece 24 might be such as could not be suitably cut by means of a cutting torch 42 and that in that instance it would be desirable to mark upon the surface of the workpiece 24 the line upon which the cutting should be done, and to thereafter cut the workpiece 24 by some other means in some other machine.

Reference has been made to the rotation of the shaft 34 and it will be appreciated that in the instance where the tool 42 is a cutting torch, rotation of this shaft 34 would cause the torch to strike the work at varying angles thereby placing upon the cutoff end of the workpiece 24 varying degrees of bevel. This is desirable in many instances where it is desired that the end of the cutoff workpiece 24 fit exactly the contour of a cylindrical member or of a plane surface disposed at an angle to the axis of the workpiece 24, or in other instances where it is desired that the cutoff end surface of the workpiece 24 not fit such other surface exactly but be disposed at a predetermined bevel with respect thereto.

For the purpose of providing for such tilting of the tool 42 as it is moved by means of the carriage 28 longitudinally of the workpiece 24 and substantially parallel to the axis thereof, there may be provided a lever 47 clamped at 48 to the shaft 34 so that when the lever 47 is swung about the axis of shaft 34 it will cause rotation of the shaft. This lever 47 is provided with a pin or slide 49 operating in a channel in the face of the upright guide member 50. This guide member 50 is made readily removable or adjustable but subject to being clamped in fixed position by means of a clamp 51 acting upon an angle bar 52 which is in turn carried on a series of short support beams 53 secured to the beams 25.

It will be seen that with the guide 49 disposed in the channel in the vertical bar or guide 50 and the clamp 48 tightened on the shaft 34, and with the shaft 34 left free to rotate by loosening of the clamps 35, movement of the carriage 28 along the track 27 will cause rotation of the shaft 34 about its axis and hence will cause tilting of the tool 42 with respect to the workpiece 24. As the carriage 28 is reciprocated along its track in the manner presently to be described, the tool 42 will be tilted first one way and then the other depending upon the movement of the tool longitudinally of the workpiece and the extent of such movement.

The mechanism for producing the reciprocating movement of the carriage 28 together with the tool 42 will now be described.

On one end of the shaft 14 is a beveled gear 54 and this beveled gear 54 meshes with another beveled gear 55 on a shaft 56 disposed at right angles to the shaft 14. It will be understood that these beveled gears are merely for the purpose of changing the direction of the driving shaft and that the mechanism now to be described might be driven directly by the shaft 14 instead of through these gears.

The shaft 56 extends into a housing 57 and within said housing carries a long driving gear 58. The housing 57 is open at one side so as to permit the gear 58 to mesh with another gear located outside this housing as will now be explained.

Surrounding the housing 57 and rotatably mounted thereon as well as slidable from end to end of the housing 57, is a collar 59 which carries a link 60 providing at its free end a mounting for a shaft 61 on which is carried an idler gear 62. The length of the link 60 is such that the idler gear 62 will at all times be in mesh with the gear 58 through the opening in the housing 57, and the opening in the housing 57 is such that by a partial rotation of the collar 59 on the housing 57 the gear 62 may be swung through a substantial arc.

The collar 59 is provided with an opening opposite the link 60 into which is fastened a housing carrying a plunger 63 with a pin 64 on its inner end adapted to engage selectively with any one of a plurality of holes 65 in the housing 57 so as to anchor the collar 59 against both endwise and rotative movement on the housing 57. This plunger is mounted within a housing 66 that is secured in the opening in the housing 59, and within this housing is carried a spring 67 that urges the plunger at all times inwardly. The plunger may be moved radially outwardly by means of a knob 68 on its outer end.

The housing 57 is mounted on or closely adjacent to another housing 69 through which extends a shaft 70, this shaft 70 carrying within the housing 69 a gear cluster 71 made up of a plurality of gears of various sizes representing the various diameters of work to be handled in the machine. It will be seen that by pulling out the plunger with the knob 68 so as to disengage it from one of the holes 65, and then swinging the collar 59 so as to permit the gear 62 to drop out of engagement with the gear cluster, the collar 59 may be shifted endwise on the housing 57 until the gear 62 comes opposite the desired portion of the gear cluster 71, whereupon it may be moved into engagement therewith and the collar 59 locked in place by permitting the pin on the plunger 63 to engage with the corresponding holes 65. In this fashion proper adjustment can be made to synchronize the rotation of the shaft 70 with any desired diameter of work resting upon the trunnions 9.

The shaft 70 is connected in any suitable fashion by a flexible drive such as the universal joint 72, the shaft 73 and the universal joint 74, to the drive shaft 75 of the mechanism for controlling the movement of the tool 42. The drive shaft 75 is appropriately mounted in bearings for maintaining it in rigid position with respect to the frame of the control mechanism and is provided with a worm 76 in driving engagement with a worm wheel 76a.

The frame of the control mechanism may be mounted in any suitable fashion such as to fix it with respect to the parts which it is to drive, but in the instance shown is mounted upon a pedestal 77 and consists of a large horizontal base plate 78 on top of the pedestal 77, together with a pair of upright bars 79 at opposite extremities of the base plate, and a beam support 80 extending between the upper ends of these uprights 79.

Journal bearings 81 are mounted on the beam 80 for the purpose of providing a rotatable mounting for the main drive shaft 82 of the control mechanism. The worm wheel 76a is mounted on the upper end of this drive shaft 82 but is not keyed to the drive shaft, being free to rotate upon the drive shaft except as it may be prevented from doing so by friction when the nut 83 on the upper end of the drive shaft is tightened against the worm wheel 76a. A handle 84 on the nut 83 facilitates the tightening and loosening of this nut.

On the lower end of the shaft 82 below the beam 80 is carried a crank arm 85 with a sliding block 86 thereon providing for adjustment of the position of the crank pin 87. The block 86 is adapted to be secured in any adjusted position on the crank 85 by means of set screws 88 bearing against a friction shoe 89 within the block.

The crank pin 87 fits within an opening in a slide block 90 which in turn is slidably mounted in a guide channel in the guide bar 91. The guide bar 91 is secured by means of screws 92 to a plate 93 adapted for angular adjustment with respect to its mount. This plate 93 is split into two parts, one part 94 being adapted to be moved slightly away from the other part by means of a set screw 95 with a tapered end, the arrangement being such that when this set screw is tightened the tapered end will be forced between the two parts of the plate 93 and these parts will be forced away from each other.

The plate 93 is rotatably mounted upon a similar plate 96 and the plate 93 has a circular rib or flange projecting from its lower surface as shown at 97, this flange engaging in a corresponding groove in the plate 96. It will be seen that when the screw 95 is tightened to force the part 94 away from the plate 93 it will cause this flange 97 to bind within the groove in the plate 96 and thereby clamp the two plates in any desired angular adjustment.

The plate 96 is mounted to move along and be guided by a track or guide 98, having rollers 99 which roll on the top surface of this guide 98, rollers 100 which engage the edges of the guide 98, and a roller 101 which engages the bottom surface of the guide 98.

The guide 98 is supported on two members 102 which lie in vertical planes but which are inclined in such fashion that they will support the track 98 substantially in the same vertical plane as the axis of the shaft 82 yet will permit the base plate 103 on which they are mounted to be offset from such axis for a reason presently to be set forth.

The bar or plate 103 is fixedly mounted on an angularly adjustable base plate 104, this plate being pivoted on the main base 78 about an axis 105 which is coincident with the extension of the axis of the shaft 82. A nut in the form of a bar 106 is employed for tightening the pivot upon which the plate 104 is carried so as to clamp the plate 104 in any desired angular adjustment with respect to the base plate 78.

In order to provide a convenient means for setting the angular adjustment of the plates 93 and 96 with respect to each other, one of these plates, preferably the plate 96, is provided with a scale with the other plate carrying an index mark, such scale being indicated at 107. For the purpose of readily determining the angle of setting of the plate 104 with respect to the plate 78, the plate 104 is likewise provided with a scale 108 which may be set readily with respect to an index mark on the plate 78. The crank arm 85 is provided with a scale to facilitate the adjustment of the block 86 and hence of the position of the crank pin 87, this scale being indicated by the numeral 109.

The slide or carriage above described which rides upon the track 98 has at its lower extremity a plate 110 on which is carried a pivot 111 providing a pivotal anchor for one end of a pitman 112. The other end of this pitman 112 is adjustably carried by a pivotal anchor 113, the adjustment being provided by causing the pitman 112 to extend through a hole in the pivotal anchor 113, and by providing a set screw 114 for tightening against the pitman to hold it in any position of adjustment. By this means the effective length of the pitman 112 may be adjusted to any desired value.

The pitman 112 may have the position at its anchor 113 adjusted laterally with respect to a line drawn from this anchor through the vertical axis of the shaft 82 by virtue of the fact that this anchor 113 is carried by a block 115 adjustably positioned in the channel 116 of a guide 117. It may be clamped in any desired position of adjustment by means of a clamping mechanism 118. A suitable scale and index are carried by the guide 117 and the block 115 to facilitate the positioning of this adjustment. Likewise, a suitable scale is carried by the pitman 112 to facilitate the adjustment of its effective length.

The guide 117 is secured to a carriage formed by brackets 119 and 120 which serve as spacers for side plates 121, the brackets 119 and 120 being secured to the end portions of the side plates 121 and carrying rollers 122 which engage the side edges of a guide 123 carried by plate 78. The side plates 121 carry rollers which engage the upper and lower surfaces of the guide 123 as indicated at 124. Thus the carriage which is provided by the brackets 119 and 120 and the side plates 121 and which carries the guide 117 is constrained to a straight line movement which is at substantially right angles to the guide 123 is for the sake of convenience guide 123 is illustrated as intersecting the axis of rotation of the shaft 82 but it may be offset laterally from this axis. However, the scale on the guide 117 should be of such a nature that when the pivot 113 is in its zero position it will be on a line parallel to the guide 123 and passing through the axis of the shaft 82, and when offset from such line, the distance by which it is offset will be indicated by the scale on the guide 117.

As illustrated, the rod 45 which is adapted to be moved endwise to shift the tool 42 in a direction parallel to the axis of the workpiece 24 during rotation of the workpiece, is shown as being directly connected to the bracket 120 and hence to the carriage of which this bracket forms a part. Under these circumstances it will be apparent that the direction of movement of this carriage is in exact alignment with the direction of movement of the carriage on which the tool 42 is mounted. However, it will be appreciated that suitable direction changing means may be employed between these two carriages so that they do not move in alignment with each other, and it is further possible that other force transmitting means might be provided so that the directions of movement of these two carriages might be in any relationship which the circumstances might require. The only thing that is required in this connection is that the carriage on which the guide 117 is mounted be restricted to a straight line movement. It is likewise required that the carriage on which the tool 42 is mounted be restricted to a straight line movement, and it is essential that the straight line movement of the one will impart a corresponding straight line movement to the other.

For the purpose of carrying out certain operations as will presently be explained, the pitman 112 would be required to be of infinite length, and in order to accomplish this purpose, within the practical dimensional limits for a machine of this type, the pitman as a connection between the plate 110 and the guide 117 is replaced by removing the pitman and the block 115 and causing a slide 125 carried directly on the plate 110 to engage within the channel 116 on the guide 117.

The apparatus as described up to this point is capable of defining on one of two cylinders which is the same size as the other, or on the smaller of the two cylinders, the line on which the two cylinders would intersect and hence the line on which such one cylinder should be cut in order to fit accurately the curvature of the other of such cylinders. It is further adapted to define on a cylinder the line along which such cylinder would intersect a plane surface at an angle to the axis of the cylinder and hence to indicate the line along which the cylinder would have to be cut in order to accurately fit a plane surface at a given angle. By employing a cutting tool as the tool for defining such line, the cylinder may be cut off in such fashion as to fit the desired surface. Also, by employing the inclining mechanism shown particularly in Figs. 11, 12, 13, and 14, it is possible to bevel or incline the cut-off edge portions so that not only does the contour of the cut fit the contour of the larger cylinder or the plane surface, but the angle of the cut likewise fits or deviates from the surface by a predetermined angle such as may be required for the purpose of welding or the like.

Reference will be had at this point to the particular adjustments of the mechanism for making cuts of a pipe, for example, in order to provide designated joints.

Referring first to Figs. 16 and 17, there is illustrated the setup for defining the line upon which a pipe or cylindrical member will intersect another cylindrical member similarly cut and of the same diameter, or along which such cylindrical member will intersect a plane surface at a predetermined angle. The various elements of the control mechanism have been shown diagrammatically and in some cases elements not employed in making this particular cut have been omitted from the diagrammatic showing.

In making the adjustment of the mechanism, the effective length of the crank 85 will be adjusted by moving the block 86 until the distance from the axis of the shaft 82 to the pin 87 will be equal to the radius of the pipe 24 which constitutes the workpiece. The gear 62 shown in Figs. 3, 4 and 5, will also be adjusted to correspond to the radius of the workpiece 24 so that the shaft 70 will rotate at such a speed that when its rotation is reduced through the worm 76 and the worm wheel 76a the crank 85 will be rotated in exact synchronism with the workpiece 24.

With the guide 91 positioned parallel to the guide 123 (and it is so positioned for all operations with this mechanism), it will be seen that as the crank 85 is rotated, the guide 91 will be moved from side to side with a simple harmonic motion. If the guide 98 were to be positioned at right angles to the guide 91, it will be seen that the movement of the guide 91 will be entirely in a direction transverse to the direction of the guide 123 and that there will be no component of movement of the guide 91 in a direction parallel to the guide 123. Hence, if the pivot 125 be engaged with the channel 116 in the guide 117 as is illustrated in Figs. 16 and 17, there would be no longitudinal movement of the guide 117 along the guide 123 and no longitudinal movement of the tool 42. Hence, as the pipe 24 is rotated there would be made a cut about the pipe at right angles to its axis. However, if it be desired that the cut be made on an angle to the axis as indicated, it is only necessary that the guide 98 be adjusted to that same angle with respect to a line normal to the guide 123. It should be borne in mind that in making this adjustment the angle of the guide 91 must be maintained parallel to the guide 123. Hence, after adjustment of guide 98 to the desired angle, the guide 91 will be readjusted until the scale 107 indicates an angle equal and opposite to that showing on scale 108. With such adjustment of the guides 98 and 91, it will be apparent that not only will the guide 91 be moved from side to side with a simple harmonic motion, but that there will be imparted to the guide 91 by virtue of the angular position of the guide 98, a component of movement in a direction parallel to the guide 123 and that such component of movement will likewise be a simple harmonic motion and will be of an extent dependent exactly upon the angle at which it is desired that the pipe 24 be cut. This component of motion will be transmitted without modification to the tool 42 by virtue of the engagement of the pivotal member 125 with the channel 116 in the guide 117. The result will be a simple harmonic motion of the tool 42 parallel to the axis of the pipe 24 and a maximum extent equal to the radius of the pipe 24 times the tangent of the angle along which the cut is being made. It is to be noted that this adjustment of the parts can be made without any computation whatsoever merely by setting the effective length of the crank 85 to correspond to the radius of the pipe 24 and by setting the angle of the guide 98 to correspond to the angle along which the cut is to be made and readjusting guide 91 to parallelism with guide 123.

It should be explained at this point that inasmuch as the surface against which the pipe 24 is to intersect will in effect be a plane surface in this instance, it might be said to correspond to a cylindrical surface at infinite radius. Instead of endeavoring to simulate a surface of infinite radius by providing an extremely long pitman 112, a more accurate determination is provided by engaging the slide 125 directly with the channel 116. However, when the pipe 24 is to be cut along the line which will provide an intersection with a cylindrical surface, the pitman 112 is employed as will presently be explained.

Referring again to Fig. 17, it will be noted that the slide 91 and hence the tool 42 will occupy the mid portion of its travel at such time as the crank pin 88 is at the point P1, and hence at that time the tool will be in the position to cut the pipe 24 at the point P1 in the rotation of the pipe. Then as the tool is moved by rotation of the crank 85 until the crank pin 88 occupies the position P2, the tool will be moved downwardly to its lower extreme position, and during this rotation of a quarter turn of the crank 85, the pipe 24 will likewise be rotated a quarter turn so that the tool will be operating then at the point P2 on the pipe. This simple harmonic motion is continued until the marking or the cut has been accomplished.

Referring now to Fig. 18, there is illustrated a setup for defining on one of two cylinders or pipes the contour of intersection thereof with another cylinder whose axis is at right angles to and in the same plane as the axis of the first cylinder. In the illustration the first mentioned one of these cylinders has a smaller diameter than the other cylinder, but this showing is by way of illustration and is not intended as a limitation because the cylinders may be of the same diameter. The setting will be made as before with the block 86 adjusted so as to make the effective length of the crank 85 equal to the radius of the pipe 24 so that the guide 91 which again is disposed in a position parallel to the guide 123, will move in a direction laterally of the guide 123 with a simple harmonic motion and the extent of such movement will be equal to the diameter of the pipe 24. However, since the angle between the two pipes 24 and 126 is in this case intended to be a right angle, the guide 98 will be positioned at a right angle to guide 123. Under these circumstances there will be no component of movement of the guide 91 in a direction longitudinally of the guide 123.

However, it will be appreciated that it will be necessary for the tool 42 to move longitudinally of the pipe 24 during the rotation of the pipe in order to define the line which would give the contour of the intersection between the pipes 24 and 126 and that this will require a simple harmonic motion dependent upon the radius of the pipe 126 and of an extent depending upon the radius of the pipe 24. In order to accomplish this, a point on the guide 91 which is represented by the pivot 111 is connected to a point on the slide which moves the tool 42 which point is indicated by the pivot 114, by a pitman 112 which is adjusted to an effective length equal to the radius of the larger pipe 126. It will be seen that when the tool 42 is disposed at the extreme upper position so as to be cutting the pipe 24 at the point $P_1$, the crank 85 would occupy the point indicated by $P_1$, and that when the crank 85 had moved to the point $P_2$, the tool 42 would be completely retracted so as to be cutting at the point $P_2$ on the pipe 24.

Referring now to Figs. 20 and 21, there is illustrated an adjustment of the apparatus for the purpose of making a cutoff of a smaller pipe or cylinder along such a line as to provide a joint between that pipe or cylinder and one of larger diameter in which the axes of the two cylinders would be disposed at right angles to each other but would be offset from each other by a predetermined distance D.

In the making of the adjustment of the apparatus for the purpose defining this line of intersection on the smaller of the two cylinders the crank 85 would again be adjusted to a length equal to the radius $r_1$ of the smaller cylinder. The guide 91, would, as before, be positioned parallel to the guide 123, and the guide 98 would be positioned at right angles to the guide 123 because of the fact that the axes of the two cylinders are to be disposed at right angles to each other. As before also the pitman 112 would be adjusted to a length equal to the radius $r_2$ of the larger cylinder. In order to provide for the lateral offset D between the two axes, the anchor 113 would be adjusted by adjustment of the block 115 until it occupies a position a distance D from a line drawn from the center of rotation of the crank 85 in a direction parallel to the guide 123.

With the parts in this adjustment, the tool 42 will be in its extreme uppermost position as illustrated in Fig. 20 at the time when the pitman 112 occupies a position of parallelism to the guide 123. At this point the tool will occupy a position on the pipe 24 a distance D offset from the axis of this pipe. By the time the crank 85 will have moved around to the point $P_1$, the tool will have moved downwardly a part of its travel until it will be opposite the point P₁ on the pipe 24, and by the time the crank 85 will have rotated to the point P₂, which is 180° from the position illustrated in Fig. 20, the pitman 112 will occupy a position farthest removed from parallelism with the guide 123 and hence will have moved the tool 42 downwardly to the greatest extent to which it will move during the entire cycle. In other words, the tool will be at that time operating at the point P₂ on the pipe 24.

Referring now to Figs. 22 and 23, there is illustrated the arrangement in which the parts are adjusted for the purpose of defining on the pipe 24 the contour along which this pipe would intersect with a larger pipe or cylinder 126.

As before, the crank 85 will be adjusted to a length equal to the radius of the pipe 24, and while the guide 91 is maintained in parallelism with the guide 123, the guide 98 will be adjusted to an angle equal to the angle at which the axes of the two cylinders are to intersect each other. The pitman 112 will be adjusted to a length corresponding to the radius $r_2$ of the larger cylinder, and the block 115 will be adjusted laterally until the anchor 114 occupies a position spaced, by a distance D equal to the offset between the axes of the two cylinders, from the line drawn through the axis of the shaft 82 in a direction parallel to the guide 123.

Attention is next directed to Fig. 24 in which there is illustrated an adjustment of the parts for the purpose of defining upon the smaller 24 of two cylinders the contour along which such cylinder would be intersected by a larger cylinder where the axes of the two cylinders lie in the same plane but at an angle other than a right angle with respect to each other.

Again the crank 85 would be adjusted to an effective length equal to the radius $r_1$ of the smaller pipe, and while the guide 91 is maintained in parallelism to the guide 123, the guide 98 will be angularly adjusted to an angle equal to the angle between the axes of the two pipes or cylinders. The pitman 112 will be adjusted to an effective length equal to the radius $r_2$ of the larger cylinder.

The description thus far has had to do with that phase of the machine whereby a tool is made to define upon one of two cylinders which is not larger than the other the line along which it would intersect the other cylinder, or on a cylinder the line along which it would intersect a plane surface. There is illustrated in Figs. 25 and 26 an additional part of the machine whereby it is possible to define upon the larger of two cylinders or upon a plane surface the line along which the cylinder or plane surface would be intersected by a smaller cylinder. In this instance, as previously, there is accomplished a relative rotation between the tool and the surface upon which the contour is to be defined, and as before there is accomplished a movement of the tool in a straight line direction, these two movements being synchronized and the extent of the latter movement being controlled by the mechanism illustrated in Figs. 6 and 7.

With more specific reference to Figs. 25 and 26, there are provided at a suitable location a pair of guides 127 and 128 adapted to receive between them a sliding bracket 129 which is adapted to be moved to an adjusted position with respect to the guides 127 and 128 and then clamped in such position by means of a clamping means 130. This bracket has a flange 131 to which is adapted to be angularly adjustably connected a bracket 132 to be clamped in any desired angular position by means of a screw 133.

The bracket 132 carries a cylinder 134 in which reciprocates a piston 135 which is in turn connected to a piston rod 136 having a keyway 137 extending a substantial portion of its exposed length. Slidably keyed to the piston rod 136 so as to be movable endwise with respect thereto but prevented from rotation with respect thereto is a worm wheel 138 adapted to be driven by a motor 139 having a worm 140 on its shaft, this worm being in engagement with the worm wheel 138.

The motor 139 is of a type which may be referred to as a self-synchronous motor and is electrically connected to a similar motor 139a on the end of the shaft 70 or in some other suitable location so that the motor 139a will be rotated exactly in accordance with the rotation of the drive for the control mechanism illustrated in Figs. 6 and 7. Due to the nature of the motors 139 and 139a, the motor 139 will be caused to rotate in exact synchronism with the motor 139a, and through the reduction provided by the gears 140 and 76, the shaft 136 will be caused to rotate in synchronism with the shaft 82 of the control mechanism which will likewise be in synchronism with a workpiece on the rollers 9 as hereinbefore described. It is to be understood, however, that the mechanism now being described may be used simultaneously with the use of the mechanism heretofore described for cutting off the end of a piece of smaller pipe while defining on a larger pipe the line of intersection between such smaller pipe and the larger pipe by means of the mechanism now being described, or the two mechanisms may be employed individually.

In order to support the motor 139 in proper alignment with the shaft 136 and thus maintain the gears 140 and 138 in proper mesh, a slidable bracket 141 is slidably mounted on the shaft 136 and secured to the motor 139. This mounting will permit the shaft 136 to reciprocate endwise with respect to the motor and the gear drive between it and the shaft. The motor will be prevented from reciprocation and from rotation about the shaft 136 by means of a guide bar extending down from the cylinder 134 and by a collar 142 secured to the motor and engaging the guide bar, and a clamp screw 143 whereby the collar 142 may be clamped to the guide bar.

On the lower end of the shaft 136 is provided a crank arm 144 having a block 145 adjustably mounted thereon for endwise movement and adapted to be clamped in position by means of a set screw 146. This block 145 supports a tool holder 145a for a tool 147 having an operating point 148 on its lower end. The tool holder 145a is separate from the block 145 and angularly adjustable thereon to any desired angle with respect to the shaft 136.

In order to provide the reciprocatory movement in a direction parallel to the axis of the shaft 136, the cylinder 134 is provided with two connections 149 and 150 for fluid lines which are connected respectively to the opposite ends of a cylinder 151 at 155 and 154. This cylinder 151 has a piston 152 reciprocable therein and connected to a piston rod 153 and is preferably of the same size and length as the cylinder and piston 134 and 135. Thus it will be seen that with the system completely filled with a hydraulic fluid, movements of the piston 152 will be exactly reflected in corresponding movements of the piston 135.

In order to provide the appropriate movement of both the piston 152 and the piston 135 together with the piston rod 136 and the tool 147, the piston rod 153 may be connected to any part movable in a straight line direction equal to the straight line movement of the tool 42. Conveniently, this part may be the slide carried on the guide 123 as illustrated. It will be appreciated, however, that any other means for transmitting the straight line movement from the part moved by the control mechanism of Figs. 6 and 7 to cause the shaft 136 to move endwise in the same proportion may be employed.

In the adjustment of the mechanism illustrated in Figs. 25 and 26 it will be understood that the operating point of the tool is positioned from the axis of shaft 136 a distance equal to the radius of the smaller cylinder. With this adjustment the tool point will define or describe a circle of the same radius as the smaller two cylinders to be joined together, or in the case of the joinder of a cylinder with a plane surface, will describe a circle of the radius of the cylinder. By mounting the larger cylinder or the plane surface on a suitable support in stationary fashion and by rotating the tool through rotation of the shaft 136, the necessary relative rotation of these parts is secured. Because it is more convenient, the tool is rotated about the axis of the shaft 136 while the pipe is held stationary.

In Figs. 25 and 26 the cylinders to be joined are shown to be of different diameters, but it is to be understood that the cylinders may be of equal diameters.

In the foregoing description the workpiece to be carried on the rollers 9 is described as being cylindrical but in certain cases it may be desirable to mount on such rollers non-cylindrical workpieces for the purpose of defining contours thereon. For example, the cylinder 24 may be formed of a flat sheet bent to cylindrical form and welded together at its edges. In such case the flat sheet before bending may be mounted on the rollers and the tool caused to define thereon a contour as the sheet is moved laterally by the rollers. This would result in a contour which, when the sheet is bent to cylindrical form, would be the desired line of intersection on the cylinder.

In the case of the joinder of two cylinders, the stationary pipe 126 will, of course, have its axis stationary and the axis of the shaft 136 will be adjusted so that it occupies with respect to the axis of the stationary pipe 126 the exact angle and location which the axis of the smaller cylinder is to occupy with respect to the axis of the larger one. For this purpose, lateral adjustments representing offsets between the two axes may be made by loosening the clamping mechanism 130 and adjusting the slide 129 laterally to an appropriate position indicated by the scale on the slide 128. It may then be clamped in this adjusted position and upon loosening the clamping mechanism 133 the bracket 132 together with the cylinder 134 and the entire mechanism carried thereby may be adjusted until the scale carried on the bracket 132 indicates the proper angular adjustment between the axis of the shaft 136 and the axis of the pipe 126.

The endwise movements of the tool being controlled by the same mechanism which controls the straight line movements of the tool 42, the endwise movements of both tools will be identical and it will readily be appreciated that while the tool 42 is defining upon the surface of a cylinder 24 the line along which that cylinder would intersect a larger cylinder 126 or a plane surface, the tool 147 may simultaneously therewith be employed to define upon the surface of the cylinder 126 or upon a plane surface the line upon which the first cylinder would intersect the second.

In view of the foregoing, it will be seen that a mechanism has been provided whereby all of the objects and advantages of this invention may be accomplished.

The invention having been described, what is claimed is:

1. In a machine for defining on one surface of a pair of surfaces a line along which it would intersect the other surface of said pair, where said pair is made up of a smaller cylinder and a larger cylinder or a plane, said machine comprising a tool, means for rotating said tool and said one surface relative to each other about the axis of the smaller cylinder if both members of the pair are cylinders or about the axis of the cylinder if only one member of the pair is a cylinder, and means for imparting to said tool and said one surface a relative reciprocation substantially parallel to said axis during said rotation, said last means comprising a part connected to said tool and reciprocable in a straight line, an intermediate element, a crank and crosshead means for transmitting simple harmonic motion to said element, a track for guiding said element in a straight line movement and adjustable about an axis coaxial with that about which said crank rotates so that said track can be adjusted with respect to the direction of reciprocation of said part to an angle equal to the minimum angle which it is desired the axis of said cylinder should make with the axis or plane of the surface it is to intersect, and means connecting said element to said part for transmitting to said part a component of the movement of said element which is parallel to the direction of reciprocation of said part.

2. A machine as set forth in claim 1 in which said connecting means is made up of a guide carried on said part and disposed substantially normal to the direction of movement of said part, and a slide on said element in engagement with said guide.

3. A machine in accordance with claim 1 in which said connecting means comprises a pitman pivoted to said part and to said element.

4. A machine in accordance with claim 1 in which said connecting means comprises a pitman pivoted to said part and to said element, the pivot on said part being adjustable laterally with respect to the direction of reciprocation of said part.

5. A machine in accordance with claim 1 in which said connecting means comprises a pitman pivoted to said part and to said element, said pitman being adjustable in length.

6. A machine in accordance with claim 1 in which said crank is adjustable in length.

7. In a machine for defining on the surface of a substantially cylindrical member a line along which it would intersect another substantially cylindrical surface or a substantially plane surface, means for rotating the member about its axis, a tool, means constraining the tool to move in a straight line parallel to the axis of the member, and means for moving said tool along said straight line over the surface of said member, said last named means comprising a part connected to said tool and reciprocable in a straight line, an intermediate element, a crank and crosshead means for transmitting simple harmonic motion to said element, a track for guiding said element in a straight line movement and disposed with respect to the direction of reciprocation of said part at an angle less than 90° and which is equal to the angle which it is desired the axis of said member shall make with the axis or plane of the surface it is to intersect, and means connecting said element to said part for transmitting to said part that component of the movement of said element which is parallel to the direction of reciprocation of said part.

8. In a machine for defining on the surface of a substantially cylindrical member a line along which it would intersect another substantially cylindrical surface or a substantially plane surface, means for rotating the member about its axis, a tool, means for constraining the tool to move in a straight line parallel to the axis of the member, and means for moving said tool along said straight line over the surface of said member, said last named means comprising a part connected to said tool and reciprocable in a straight line, an intermediate element, a crank and crosshead means for transmitting simple harmonic motion to said element, a track for guiding said element in a straight line movement and angularly adjustable with respect to the direction of reciprocation of said part, and means connecting said element to said part for transmitting to said part that component of the movement of said element which is parallel to the direction of reciprocation of said part, said last named means comprising a guide connected to the part and disposed transversely to the direction of reciprocation of said part and reciprocable therewith, an anchor selectively positionable along said guide and means connecting said element to said anchor.

9. In a machine for defining on a substantially cylindrical surface or on a substantially plane surface a line along which it would intersect with a cylindrical member, a tool, means for rotatably mounting said tool on an axis disposed with respect to said cylindrical surface or said plane surface substantially coincident with the position which it is desired the axis of said cylindrical member shall occupy, means for rotating said tool about said axis, and means for reciprocating said tool axially as it rotates to keep it in constant working relation to the adjacent surface, said last means comprising a part connected to said tool and reciprocable in a straight line, an intermediate element, a crank and crosshead means for transmitting simple harmonic motion to said element, a track for guiding said element in a straight line movement and adjustable about an axis coaxial with that about which said crank rotates so that said track can be adjusted with respect to the direction of reciprocation of said part to an angle equal to the minimum angle which it is desired the axis of said member shall make with the axis or plane of the surface it is to intersect, and means connecting said element to said part for transmitting to said part that component of the movement of said element which is parallel to the direction of reciprocation of said part.

10. In a machine for defining on a substantially cylindrical surface or on a substantially plane surface a line along which it would intersect with a cylindrical member, a tool, means for rotatably mounting said tool on an axis disposed with respect to said cylindrical surface or said plane surface substantially coincident with the position which it is desired the axis of said cylindrical member shall occupy, means for rotating said tool about said axis, and means for reciprocating said tool axially as it rotates to keep it in constant working relation to said adjacent surface, said last means comprising a part connected to said tool and reciprocable in a straight line, an intermediate element, a crank and crosshead means for transmitting simple harmonic motion to said element, a track for guiding said element in a straight line movement and angularly adjustable about an axis coaxial with that about which said crank rotates so that said track can be adjusted with respect to the direction of reciprocation of said part to an angle equal to the minimum angle which it is desired the axis of said member shall make with the axis or plane of the surface it is to intersect, and means connecting said element to said part for transmitting to said part that component of the movement of said element which is parallel to the direction of reciprocation of said part.

11. A machine for defining on the surface of a cylinder of given radius a path along which said surface would intersect another cylindrical surface of greater given radius with the axes of said surfaces at a given angle to each other and at a given offset from each other, comprising means for rotating said cylinder about its axis, a tool mounted for reciprocation along the surface of said cylinder substantially parallel to the axis thereof, and means for reciprocating said tool while said cylinder is being rotated, said last means comprising a part connected to said tool and guided for substantially straight line reciprocation, a crank of a length corresponding to the radius of said cylinder and mounted for rotation on a fixed axis, means for rotating said crank in synchronism with the rotation of said cylinder, a fixed guide extending transversely of the axis of said crank and disposed at an angle to the direction of said straight line reciprocation equal to the angle between the axes of said cylindrical surfaces, a slide on said guide for bodily movement therealong, a moving guide fixed on said slide to move therewith and disposed substantially parallel to the direction of said straight line reciprocation, a part carried by said crank and operably engaging said moving guide whereby rotation of said crank will produce a lateral simple harmonic movement of said moving guide along said fixed guide, and a pitman of a length corresponding to the radius of the larger cylindrical surface pivotally connecting a point on said moving guide with a point on said straight line reciprocating part, the point on said part being separated from a line parallel to the direction of movement of said part and intersecting the axis of rotation of said crank, by an amount equal to the offset between the axes of said cylindrical surfaces.

12. In a machine for defining on the surface of one workpiece a line along which the surface of said one workpiece would intersect the surface of another workpiece, where said one and another workpieces constitute two cylinders or a cylinder and a plane, said machine comprising a tool having an operating point, means for rotating said tool and said one workpiece relative to each other about an axis, and means for imparting to said tool and said one workpiece a relative reciprocation substantially parallel to said axis about which said rotating is occurring, the last-mentioned means including a first part connected to the tool and reciprocable in a straight line, an intermediate element, means transmitting simple harmonic motion to said element, means constraining movement of said element to be in a straight line, a second part having a pivotal connection with said element, a third part having a pivotal connection with said first part, and means connecting said second and third parts together and having a constant effective length between said pivotal connections so that a component of the movement of said element is transmitted to said first part.

13. The apparatus of claim 12 wherein said connecting means is a pitman.

14. In a machine for defining on the surface of one workpiece a line along which the surface of said one workpiece would intersect the surface of another workpiece, where said one and another workpieces constitute two cylinders or a cylinder and a plane, said machine comprising a tool having an operating point, means for rotating said tool and said one workpiece relative to each other about an axis, and means for imparting to said tool and said one workpiece a relative reciprocation substantially parallel to said axis about which said rotating is occurring, the last-mentioned means including a first part connected to the tool and reciprocable in a straight line, an intermediate element, means transmitting simple harmonic motion to said element, means constraining movement of said element to be in a straight line at an angle with the line of movement of said first part which is less than 90°, a guide carried by said first part and disposed transversely to the direction of movement of said first part and a second part carried by said element in a position fixed relative to said element, said second part being slidably connected to said guide for movement therealong responsive to movement of said element whereby the component of movement of said element which is parallel to the direction of movement of said first part is transmitted to said first part.

15. In a machine for defining on the surface of one workpiece a line along which the surface of said one workpiece would intersect the surface of another workpiece, where said one and another workpieces constitute two cylinders or a cylinder and a plane, said machine comprising a tool having an operating point, means for rotating said tool and said one workpiece relative to each other about an axis, and means for imparting to said tool and said one workpiece a relative reciprocation substantially parallel to said axis about which said rotating is occurring, the last-mentioned means including a reciprocable part connected to the tool, a guide constraining movement of said part to be in a straight line, an intermediate element, a crosshead disposed substantially parallel to the direction of movement of said part and connected to said element, a crank having an end slidable in said crosshead to impart upon rotation of the crank a simple harmonic motion to the crosshead, a track slidably engaging said element to constrain the element in a straight line movement and adjustable angularly about an axis coaxial with the axis of rotation of said crank so that the direction in which the element is constrained to move by said track can be adjusted to be at an angle with respect to the direction of reciprocation of said part equal to the minimum angle which is desired between the axis of a cylindrical workpiece and the axis or plane of another workpiece, a guide carried by said part disposed substantially normal to the direction of movement of said part, an anchor selectively adjustable in position along the guide carried by said part and a pitman pivotally connected to said element and to said anchor.

16. The apparatus of claim 15 wherein the length of said crank between its axis of rotation and its end slidable in said crosshead is adjustable and wherein the length of the pitman between its pivotal connections to said part and said anchor is adjustable.

17. In a machine for defining on the surface of one workpiece a line along which the surface of said one workpiece would intersect the surface of another workpiece, where said one and another workpieces constitute two cylinders or a cylinder and a plane, said machine comprising a tool having an operating point, means for rotating said tool and said one workpiece relative to each other about an axis, and means for imparting to said tool and said one workpiece a relative reciprocation substantially parallel to said axis about which said rotating is occurring, the last-mentioned means including a reciprocable part connected to the tool, a guide constraining movement of said part to be in a straight line, an intermediate element, a crosshead disposed substantially parallel to the direction of movement of said part and connected to said element, a crank having an end slidable in said crosshead to impart upon rotation of the crank a simple harmonic motion to the crosshead, a track slidably engaging said element to constrain the element in a straight line movement and adjustable angularly about an axis coaxial with the axis of rotation of said crank so that the direction in which the element is constrained to move by said track can be adjusted to be at an angle with respect to the direction of reciprocation of said part equal to the minimum angle which is desired between the axis of a cylindrical workpiece and the axis or plane of another workpiece, a guide carried by said part disposed substantially normal to the direction of movement of said part, a slide fixedly carried by said element and disposed in slidable engagement with the guide carried by said part.

References Cited in the file of this patent

UNITED STATES PATENTS

| | | |
|---|---|---|
| 1,858,077 | Douglass et al. | May 10, 1932 |
| 1,954,549 | Twigg et al. | Apr. 10, 1934 |
| 1,963,537 | Tweit | June 19, 1934 |
| 2,063,498 | Glick | Dec. 8, 1936 |
| 2,295,182 | Norton | Sept. 8, 1942 |
| 2,379,630 | Fall | July 3, 1945 |
| 2,528,147 | Jesonis | Oct. 31, 1950 |